(12) United States Patent
Bönisch et al.

(10) Patent No.: US 12,180,078 B2
(45) Date of Patent: Dec. 31, 2024

(54) PROCESS FOR PRODUCING POLYCRYSTALLINE SILICON

(71) Applicant: WACKER CHEMIE AG, Munich (DE)

(72) Inventors: Paul Bönisch, Mehring (DE); Piotr Filar, Marktl (DE)

(73) Assignee: Wacker Chemie AG, Munich (DE)

( * ) Notice: Subject to any disclaimer, the term of this patent is extended or adjusted under 35 U.S.C. 154(b) by 470 days.

(21) Appl. No.: 17/613,073

(22) PCT Filed: May 21, 2019

(86) PCT No.: PCT/EP2019/063112
§ 371 (c)(1),
(2) Date: Nov. 21, 2021

(87) PCT Pub. No.: WO2020/233797
PCT Pub. Date: Nov. 26, 2020

(65) Prior Publication Data
US 2022/0259051 A1 Aug. 18, 2022

(51) Int. Cl.
C01B 33/035 (2006.01)
(52) U.S. Cl.
CPC .................. C01B 33/035 (2013.01)
(58) Field of Classification Search
None
See application file for complete search history.

(56) References Cited

U.S. PATENT DOCUMENTS

2008/0286550 A1 11/2008 Sofin et al.
2010/0219380 A1 9/2010 Hertlein et al.
(Continued)

FOREIGN PATENT DOCUMENTS

EP 1992593 B1 10/2010
EP 2444373 B1 12/2012
(Continued)

OTHER PUBLICATIONS

Chemische Enzyklopädie [Chemical Encyclopaedia], Moscow, 1990; vol. 2, p. 1007 and Table 2.

Primary Examiner — Michael Forrest

(57) ABSTRACT

Method for producing polycrystalline silicon by inducing reaction gas, which in addition to hydrogen contains silane and/or at least one halosilane, into a reaction space of a vapour deposition reactor. The reaction space comprises at least one filament rod heated by the passage of current and on which by means of deposition silicon is deposited to form a polycrystalline silicon rod. A determination of morphology of the silicon rod during deposition at a rod temperature a first resistance $R_1$ of the silicon rod is determined by $$R_1 = \frac{U}{I}$$

where U is a voltage between two ends of the silicon rod and I is a current strength, and a second resistance $R_2$ is determined by $$R_2 = \rho \frac{L}{A}$$

were ρ is a resistivity of silicon, L is a length of the silicon rod and A is a cross-sectional area of the silicon rod. A morphology index M is calculated from the ratio $R_1/R_2$.

20 Claims, 2 Drawing Sheets

(56) References Cited

U.S. PATENT DOCUMENTS

| | | |
|---|---|---|
| 2012/0100302 A1 | 4/2012 | Fabry et al. |
| 2012/0322175 A1 | 12/2012 | Pazzaglia et al. |
| 2013/0295408 A1 | 11/2013 | Weber et al. |
| 2014/0314654 A1* | 10/2014 | Sofin .................... C01B 33/035 428/401 |
| 2016/0068949 A1 | 3/2016 | Kerscher et al. |
| 2018/0065858 A1 | 3/2018 | Klose et al. |
| 2020/0373177 A1 | 11/2020 | Seifarth et al. |

FOREIGN PATENT DOCUMENTS

| | | |
|---|---|---|
| EP | 2077252 B1 | 2/2017 |
| EP | 2662335 B1 | 4/2017 |
| JP | 2001146499 A | 5/2001 |
| WO | 09047107 A2 | 4/2009 |
| WO | 14173596 A1 | 10/2014 |
| WO | 15014590 A1 | 2/2015 |
| WO | 2019110091 A1 | 6/2019 |

* cited by examiner

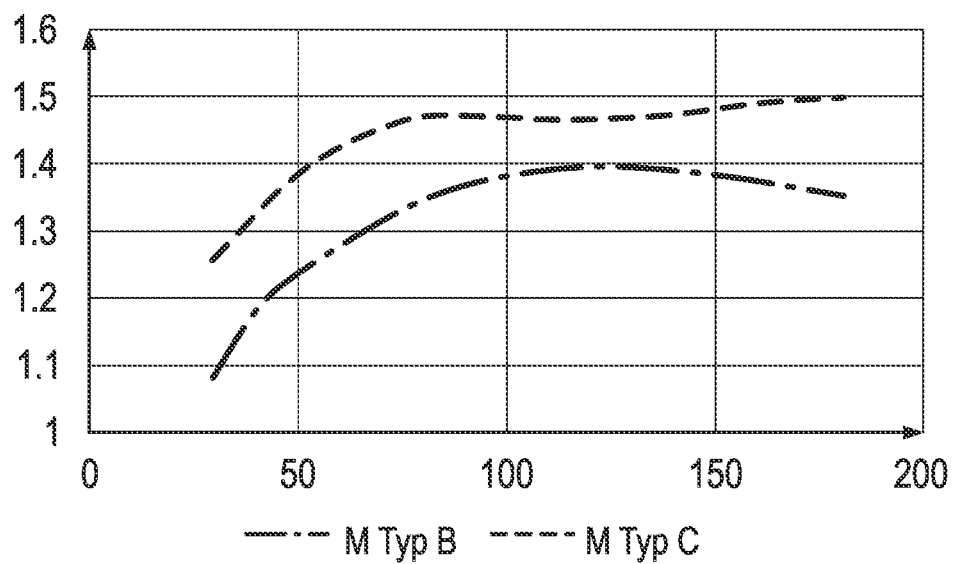

PROCESS FOR PRODUCING POLYCRYSTALLINE SILICON

CROSS-REFERENCE TO RELATED APPLICATIONS

This application is a U.S. National Phase application of PCT Application No. PCT/EP2019/063112 filed on May 21, 2019 the disclosure of which is incorporated by reference herein in its entirety.

The invention relates to a method for producing polycrystalline silicon, wherein during the method the morphology of the silicon is determined on the basis of an index M and the method is controlled in such a way that M assumes a value from 0.8 to 2.5.

Polycrystalline silicon (polysilicon) serves as a starting material in the production of single-crystal (monocrystalline) silicon, for example by means of crucible pulling (Czochralski or CZ process) or by means of zone melting (float zone process). Single-crystal silicon is used in the semiconductor industry for the manufacture of electronic components (chips).

Polysilicon is also needed for the production of multicrystalline silicon, by way of example by means of block casting processes. The multicrystalline silicon, obtained in the form of a block, can be used for the manufacture of solar cells.

Polysilicon can be obtained by the Siemens process—a chemical vapour deposition process. This involves heating support bodies (usually composed of polysilicon) in a bell-shaped reactor (Siemens reactor) by way of the direct passage of current and introducing a reaction gas comprising a silicon-containing component and hydrogen. The silicon-containing component is generally monosilane ($SiH_4$) or a halosilane of the general composition $SiH_nX_{4-n}$ (n=0, 1, 2, 3; X=Cl, Br, I). It is typically a chlorosilane or a chlorosilane mixture, usually trichlorosilane ($SiHCl_3$, TCS). Predominantly, $SiH_4$ or TCS is used in a mixture with hydrogen. The structure of a typical Siemens reactor is described by way of example in EP 2 077 252 A2 or EP 2 444 373 A1. The bottom of the reactor (bottom plate) is generally provided with electrodes that receive the support bodies. The support bodies are customarily filament rods (thin rods) made of silicon. Typically, two filament rods are connected via a bridge (made of silicon) to form a pair that forms a circuit via the electrodes. The surface temperature of the filament rods is typically more than 1000° C. during the deposition. At these temperatures, the silicon-containing component of the reaction gas decomposes and elemental silicon is deposited from the vapour phase as polysilicon. The diameter of the filament rods and of the bridge increases as a result. After reaching a predetermined diameter of the rods, the deposition is usually stopped and the polysilicon rods obtained are removed. After the removal of the bridge, approximately cylindrical silicon rods are obtained.

The morphology of the polysilicon or of the polysilicon rods and of the fragments produced from these generally has a strong influence on the performance during further processing. The morphology of a polysilicon rod is fundamentally determined by the parameters of the deposition process (e.g. rod temperature, silane and/or chlorosilane concentration, specific flow rate). Depending on the parameters, pronounced interfaces, up to and including holes and trenches, can form. These are generally distributed inhomogeneously within the rod. What is more, polysilicon rods having various (usually concentric) morphological regions can form as a result of variation of the parameters, as has been described by way of example in EP 2 662 335 A1. The dependence of the morphology on the rod temperature is brought up for example in US 2012/0322175 A1. This document describes a method for monitoring the surface temperature via a resistance measurement at at least one polysilicon rod during the deposition. However, the method does not permit any conclusions regarding the morphology of the silicon, on the contrary a uniform morphology is a prerequisite.

The morphology of polysilicon can range from compact and smooth to very porous and fissured. Compact polysilicon is essentially free from cracks, pores, joints and fissures. The apparent density of polysilicon of this type can be equated to the true density of silicon or at least corresponds to this to a good approximation. The true density of silicon is 2.329 $g/cm^3$.

A porous and fissured morphology has negative effects in particular on the crystallization behaviour of polysilicon. This is particularly highly apparent in the CZ process for producing single-crystal silicon. Here, the use of fissured and porous polysilicon leads to economically unacceptable yields. In general, in the CZ process particularly compact polysilicon leads to markedly higher yields. However, the production of compact polysilicon is usually more expensive since a longer deposition process is needed. In addition, not all applications require the use of particularly compact polysilicon. For example, the requirements on the morphology when producing multicrystalline silicon by the block casting process are much lower. In general, a crystallization process or a particular form of such a process achieves an economic optimum when the starting material used is polysilicon having a morphology which does not exceed a limit value.

Accordingly, polysilicon is distinguished and classified not only according the purity and the chunk size but also according to its morphology. Since various parameters can be subsumed under the term "morphology", such as for example porosity (sum of closed and open porosity), specific surface area, roughness, gloss and colour, reproducible determination of the morphology presents a great challenge. A visual assessment of the polysilicon rods or fragments after the deposition, as proposed inter alia in WO 2014/173596 A1, has the disadvantage that the morphology in the interior can potentially differ markedly from the morphology of the surface.

For example, for the determination of the porosity, the volume of the test object can be determined by means of a differential method and then the effective density can be compared with the relative density. In the simplest case, the test object is immersed in a full water container, with the volume of the water that has overflowed corresponding to that of the test object. Applied to polysilicon, a suitable fluid has to be used in order to avoid oxidation and contamination and to wet the surface completely. In particular in the case of polysilicon rods produced by the Siemens process, which may have a length of between 2 and 4 m, this is associated with considerable effort. Possibilities for measuring the density in the case of polysilicon have been described, for example, in WO 2009/047107 A2. A fundamental disadvantage with a subsequent inspection of the morphology is that it is too late to influence the deposition process and hence to control the morphology.

The invention was based on the object of providing a method for determining the morphology of polysilicon during the deposition in order to make the production and processing of the polysilicon more efficient.

This object is achieved by a method for producing polysilicon, comprising introducing a reaction gas, which in addition to hydrogen contains silane and/or at least one halosilane, into a reaction space of a vapour deposition reactor, wherein the reaction space comprises at least one filament rod which is heated by way of the passage of current and on which by means of deposition silicon is deposited to form a polycrystalline silicon rod. For the determination of the morphology of the silicon rod, during the deposition at an average rod temperature $T_S$ a first resistance value $R_1$ of the silicon rod is determined according to $$R_1 = \frac{U}{I}$$

where
U=voltage between two ends of the silicon rod [V],
I=current strength [A]
a second resistance value $R_2$ of the silicon rod is determined according to $$R_2 = \rho \frac{L}{A}$$

where
$\rho$=resistivity of silicon [$\Omega$*m],
L=length of the silicon rod [m],
A=cross-sectional area of the silicon rod [m$^2$],
and a morphology index M is calculated from the ratio $R_1/R_2$, wherein the deposition (depending on M) is controlled in such a way that M has a value from 0.8 to 2.5.

As already described at the outset, polysilicon with varying morphology can form depending on the deposition parameters, wherein regions of differing morphology which are separated from each other by interfaces can also occur within the same polysilicon rod, in particular in the radial direction of the cross-sectional area thereof. Morphology is to be understood here in particular to mean the degree of fissuring in the polysilicon resulting from the frequency and arrangement of holes, pores and trenches. The morphology can also be understood to mean the overall porosity of the polysilicon, which is made up of the sum total of all cavities connected to each other and to the surroundings and of the cavities not connected to each other. The overall porosity, that is to say the proportion of the overall pore volume (open and closed pores) in the overall volume of the polysilicon, can be determined in accordance with DIN-EN 1936.

It has been recognized that in particular the holes and trenches are not distributed homogeneously in the deposited polysilicon, but rather inhomogeneously in accordance with the deposition. The longitudinal direction in this case preferably points in the radial direction, that is to say in the growth direction. As a result, certain transport processes in the polysilicon may be direction-dependent (anisotropic). In other words, polysilicon can exhibit macroscopically anisotropic material properties.

This effect is particularly relevant in the case of electrical resistance R, since the current flow predominantly in the axial direction (longitudinal direction) of the polysilicon rod rises R compared to compact polysilicon. R of a polysilicon rod is therefore greater, the more pronounced its degree of fissuring or porosity.

In the method according to the invention, the morphology is determined directly during the ash separation, with an electrothermal model being used which makes direct use of process data. A generally laborious and usually imprecise visual analysis of the polysilicon rods as a whole or in the form of fragments is not necessary after the deposition. By using process data that are available anyway, the method according to the invention is scalable as desired. The use of the morphology index M for process control offers substantial potential for quality assurance and maximization of productivity. In particular, by means of constant monitoring of the morphology and process control depending on the morphology, polysilicon can be produced precisely according to customer requirements.

For the production of type A polysilicon, control is preferably effected in such a way that M has a value from 0.8 to 1.2. Type A is generally very compact and intended for the production of semiconductors. In particular for the CZ process with the aim of maximizing dislocation-free yields.

For the production of type B polysilicon, control is preferably effected in such a way that M has a value from 1.2 to 1.4. Type B generally has an average compactness and is used in particular for cost-optimized, robust semiconductor applications and demanding solar applications using monocrystalline silicon (CZ process).

For the production of type C polysilicon, which is required in particular for robust solar applications using monocrystalline silicon, control is preferably effected in such a way that M has a value from 1.4 to 1.7. Type C is less compact than type B, is cheaper and is particularly suitable for recharging processes in the CZ process.

For the production of type D polysilicon, control is preferably effected in such a way that M has a value above 1.7. Type C exhibits a relatively high proportion of popcorn. It has a relatively fissured surface and a high porosity. It is used in particular for the production of multicrystalline silicon for solar applications by means of directional solidification or block casting.

M particularly preferably has a value from 1 to 1.8, in particular from 1.2 to 1.6.

M is preferably kept essentially constant during the deposition. "Essentially" should in particular be understood to mean that temporary deviations of plus/minus 0.1 from a setpoint value for M may occur.

The index M can be determined continuously during the entire duration of the deposition or discontinuously at various points in time, preferably in equal intervals of time, in the deposition. M is preferably determined continuously in order to ensure a particularly precise control of the deposition.

The index M can furthermore be determined in discretized form in a time interval, where the time interval can in particular correspond to a specified growth in the diameter of the silicon rod. In this way, a statement can be made regarding the morphology of a region (coaxial region) of the silicon rod which has grown epitaxially in a particular time interval. In this respect, reference can be made to example 2 in conjunction with FIG. 2.

M is a dimensionless index resulting from the ratio of the first directly measurable resistance $R_1$ to the second theoretical resistance $R_2$. The more fissured/porous a polysilicon rod is, the greater M is. For example, polysilicon rods for which M is greater than 1.5 exhibit a considerable proportion of so-called popcorn. Popcorn means that the polysilicon has cracks, splits and fissures and as a consequence of this fissured nature has a very large surface area.

$R_1$, which can also be referred to as the heating resistance, is determined from the voltage U and the current strength I measured on the silicon rod according to Ohm's law. I (rod current) is the current strength with which a filament rod/ silicon rod is heated (Joule heating). U is the voltage which is applied across the ends of a silicon rod or filament rod for producing the rod current. The filament rod is preferably two thin rods made from silicon which have been connected to form a rod pair via a bridge (made from silicon). The two free ends of the rod pair are usually connected to electrodes at the reactor bottom. U and I can be measured using commercially available measuring instruments. U and I are usually constantly displayed at a process control station and optionally recorded.

The number of silicon rods/silicon rod pairs arranged in the vapour deposition reactor is generally unimportant for the execution of the method according to the invention. The vapour deposition reactor is preferably a Siemens reactor as has been described in the introduction and by way of example in EP 2 662 335 A1. Typical examples of the number of silicon rods in a reactor are 36 (18 rod pairs), 48 (24 rod pairs), 54 (27 rod pairs), 72 (36 rod pairs) or 96 (48 rod pairs). The silicon rods can be considered to be cylindrical to a good approximation at all times during the deposition. This is irrespective in particular of whether the thin rods have a cylindrical or for example square design. Accordingly, mean values of U and I resulting for example from a measurement on each rod pair in the reactor can also be used to determine $R_1$.

$R_2$ is determined by multiplying the resistivity ρ of silicon by the length L of the silicon rod and dividing by the cross-sectional area A of the silicon rod.

L fundamentally corresponds to the length of the silicon rod measured from one electrode to the other electrode in the reactor bottom. The length of the filament rod and possibly of the bridge is typically used as a basis for determining L. This is known or can be measured before installation into the reactor. For a silicon rod pair described above, L would result from the sum of the lengths of the two thin rods and of the bridge. The fact that the form of the silicon rod after the deposition may differ from that of the filament rod is unimportant for the execution of the invention. The portion of the thin rods that is sunk into the electrodes or electrode holders is also unimportant. This can be disregarded.

L is preferably 2 to 8 m, particularly preferably 3 to 7 m, especially 4 to 6.6 m, especially preferably 5.6 to 6.4 m.

The cross-sectional area A can take place by way of measuring the diameter or circumference of at least one silicon rod. Since it can be assumed that the silicon rods are cylindrical and the diameter of all silicon rods in the reactor is essentially identical, in particular when measured values at the same rod height are compared, A can be calculated according to $A = *d^2/4$, where d=rod diameter. This approximation is justified as modern Siemens reactors are designed for ensuring maximum homogeneity of deposition, that is to say for generating silicon rods of identical quality and form. This can be achieved by way of a homogeneous gas flow within the reactor and an essentially symmetrical arrangement of the rods. The rod or rods on which the diameter is determined (the same applies for the determination of the surface temperature $T_{OF}$) is fundamentally unimportant for the execution of the invention.

For the determination of A of the silicon rod preferably at least one diameter of the silicon rod and/or at least one diameter of at least one other silicon rod is determined. Particularly preferably, the diameter of at least two, in particular three or four, silicon rods is determined. An arithmetic mean can be formed from the values ascertained, which can increase the measurement accuracy.

The diameter is preferably determined from outside the reactor through a viewing window, in particular by means of a camera. Two or more cameras which can be positioned variously around the reactor may also be used. The cameras are preferably positioned beside one another (in the circumferential direction of the reactor) each in front of a viewing window. They can also be positioned beside one another or above one another in front of a viewing window. The cameras can also be situated at different heights. The diameter is usually determined on a silicon rod which is closest to the viewing window. It is generally unimportant whether the diameter is determined (the same applies for the determination of the surface temperature $T_{OF}$) at the height of the middle of the rod for example (middle between bridge and electrode) or at the height of the upper or lower third of the rod. Measurement is preferably effected at the middle of the rod.

The camera may be an optical camera (e.g. digital/CCD camera) and/or thermographic camera. The diameter can be determined by means of (in particular digital) image processing of one or more of the generated images or else image sections. It is also possible to produce a video, with individual images of the video preferably being subjected to image processing. The image processing can in particular be effected by software which is preferably integrated into the system of the process control station.

For example, the diameter can be determined by selecting the focal point of the camera such that at least one silicon rod is visible widthwise in front of the inner reactor wall. By means of pixel analysis, a left-hand outline and a right-hand outline of the silicon rod can then be identified and the distance lying in-between can be determined. The camera is typically calibrated in such a way that the image recorded thereby corresponds in terms of its width to a certain distance in the circumferential direction on the reactor inner wall. The reactor geometry, in particular the reactor circumference at the height of the camera, is known in principle. The position of the silicon rod and hence the distance thereof from the reactor inner wall and from the camera is likewise usually known. It is also possible to measure the distance between two adjacent rods in front of the reactor wall and to calculate from this the diameters thereof, in particular by means of triangulation. In this variant, the two adjacent rods do not necessarily have to be visible in their entire width. By correlating the distances or spacings known from the reactor configuration, the diameter can be calculated by means of the distance of the rods from each other.

As an alternative or in addition, the diameter can also be determined from parameters of the deposition process that are generally recorded constantly. The parameters may for example be the volume flow rate of the reaction gas, the surface temperature $T_{OF}$ of the silicon rods, I, U, $R_1$ and deposition duration. For example, comparison data from previous deposition processes can then be used to calculate the rod diameter as a function of the deposition duration.

The resistivity ρ indicates the electrical resistance of a conductor made from a material (e.g. silicon) which is 1 m long and has a continuous cross-sectional area of 1 $mm^2$. In principle, ρ depends on the temperature. ρ of silicon can be found in tabular works (cf. Chemische Enzyklopädie [Chemical Encyclopaedia], Moscow, 1990; volume 2: page 1007, cf. also table 2) and for the temperature range relevant to the deposition of 800 to 1300° C. has values of 0.00001 and 0.0005 Ω*m. The determination of the average rod temperature $T_S$ at which both $R_1$ and $R_2$ are determined is thus particularly important.

Preferably, $T_S$ is determined as the surface temperature $T_{OF}$ of the silicon rod or as an arithmetic mean of two or more surface temperatures $T_{OF}$ of the same or different silicon rods. $T_{OF}$ is an important influencing variable which during the deposition can typically be controlled and can be adapted via variation of the passage of current. In principle, the flow of heat leaving the silicon rods increases with the deposition time, as the diameter and hence the surface area of the rods increases. An adaptation of the current strength is therefore typically necessary during the deposition.

In a preferred embodiment, $T_S$ is determined by adding a constant or variable temperature offset to the surface temperature $T_{OF}$. The temperature offset here is preferably in the range from 0 to 120 K, particularly preferably in the range from 30 to 80 K. As a result, account can be taken of the fact that $T_S$ can be above the measured surface temperature $T_{OF}$. The temperature offset is generally greater, the greater the heating power U*I and/or rod diameter d. The temperature offset can thus be specified variably depending on U*I and d.

$T_{OF}$ is preferably measured using at least one thermographic camera (radiation pyrometer), in particular from outside the reactor through a viewing window. In principle, the same applies to the determination of $T_{OF}$ (in particular in respect of the positioning of the measuring instrument and the location of the measurement) as for the diameter determination. In this respect, reference can be made to the statements above. In addition, reference can be made to the as-yet unpublished PCT/EP2017/081551.

Since both the diameter and $T_{OF}$ can be determined using a thermographic camera, both values can be determined on the same silicon rod.

In a preferred embodiment, $T_S$ is determined according to $$T_S = k \frac{U*I}{A_{OF}*\lambda} * (r_{II} - r_s) + T_{OF},$$

where
k=adjustment factor,
$A_{OF}$=rod surface area along the rod length,
$\lambda$=thermal conductivity of silicon,
$r_{II}$=radius of the silicon rod,
$r_S$=radius of the centroid of the cross-sectional area of the silicon rod.

This model for determining $T_S$ is illustrated by means of the diagram in FIG. 1. The model is based on the measured $T_{OF}$, on the rod diameter d ($2*r_{II}$), on the electrical heating power (UI) and on the thermal conductivity $\lambda$. The thermal conductivity A of silicon in the relevant temperature range of 800 to 1300° C. is about 18 to 30 W/(m*K). A constant value of 22 W/(m*K) can be used as a basis for $\lambda$.

$U*I/A_{OF}*\lambda$ is the temperature gradient grad $T_{OF}$ at the rod surface, with the latter being determined via $\pi*d*L$. This approach takes into account the fact that the overall electrical power is fundamentally conducted as a flow of heat across the rod surface. Since the silicon rod is cylindrical to a good approximation (this can to a good approximation also be assumed of the bridge) and the electrical heating power is distributed over the rod cross section, the temperature gradient decreases in the direction of the rod interior. In the centre of the rod the temperature gradient assumes the value zero (the first derivative of the curve at $r_{II}$ corresponds to the straight line (slope) grad $T_{OF}$). According to this model $T_S$ is defined as the temperature which prevails in the area centroid of the rod cross section ($T_S$ at $r_S$). The area centroid is the radius $r_S$ at which the area of an inner circle is equal to that of an outer ring. Multiplying the temperature gradient grad $T_{OF}$ with the adjustment factor k gives k*grad$T_{OF}$ (dashed line next to the tangent grad$T_{OF}$). Together with the distance to the rod surface ($r_{II}$-$r_S$) and addition of $T_{OF}$, $T_S$ can be determined. The adjustment factor k here is preferably in a range from 0 and 1.2, particularly preferably from 0.7 and 0.9. A typical value for k is for example 0.8.

The deposition is preferably controlled by varying at least one parameter selected from the group comprising U, I, $T_{OF}$, reaction gas composition and volume flow rate.

This is generally done by means of a continuous or discontinuous feedback to the process control station, wherein the parameters are adapted depending on the determined morphology index M in order to reach a setpoint value for M.

The voltage U (per rod pair) is in this case preferably in a range from 50 and 500 V, particularly preferably from 55 and 250 V, especially from 60 and 100 V.

The current strength I (per rod pair) is in this case preferably in a range from 500 and 4500 A, particularly preferably from 1500 and 4000 A, especially from 2500 and 3500 A.

Method according to any of the preceding claims, characterized in that the current strength I is in a range from 500 and 4500 A, preferably from 1500 and 4000 A, particularly preferably from 2500 and 3500 A.

$T_{OF}$ by preference is in a range from 950 to 1200° C., preferably from 1000 to 1150° C.

The reaction gas prior to entry into the reactor preferably contains hydrogen in a proportion of 50% to 90%, preferably of 60% to 80%. The composition of the reaction gas can be determined prior to supply to the reactor via Raman and infrared spectroscopy and also via gas chromatography.

The standard volume flow rate (measurable according to DIN EN 1343) of the reaction gas is preferably 1500 to 9000 m³/h, particularly preferably 3000 to 8000 m³/h.

Polysilicon of a very wide variety of qualities (e.g. type A, B, C and D) can be produced by way of controlling the deposition. By way of example, silicon rods having coaxial regions of varying morphology can also be produced. Particularly advantageously, the entire deposition process can be adapted to the respective quality requirements and the most economical operation mode of the reactor can thus always be chosen.

FIG. 1 graphically illustrates a model for the determination of the average rod temperature $T_S$.

FIG. 3 shows the profile of the morphology index M as a function of the rod diameter d for two types of polysilicon.

EXAMPLES

Example 1: Discretized Determination of M

The determination of M is presented for a section of a polysilicon rod of the type C which has grown in a period of time.

Figure 1:
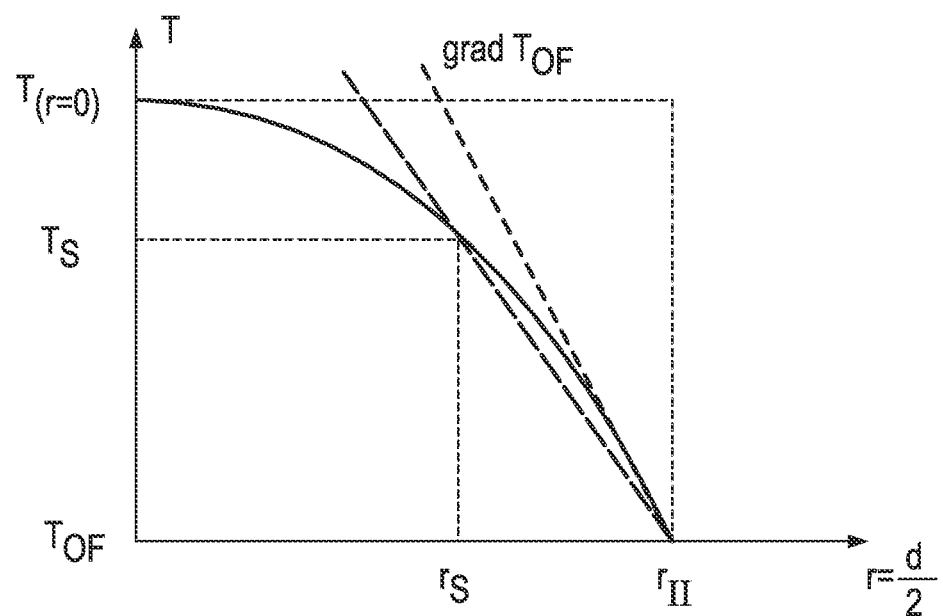
Figure 2:
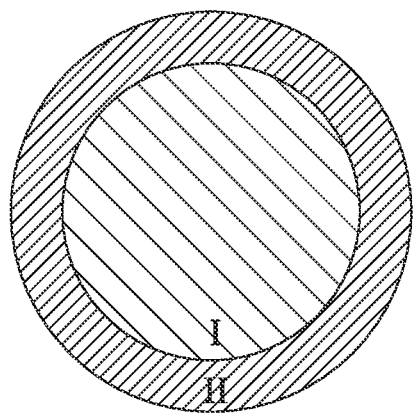
FIG. 2 shows the cross-sectional area of a polysilicon rod.

In FIG. 1, the region I corresponds to a polysilicon rod having a diameter $d_I$ and a temperature $T_I$ at a time $t_0$. The region II corresponds to a rod section that has grown in a period of time $\Delta t = t_1 - t_0$ and has a thickness $d_{II} - d_I$ (diameter growth) and a temperature $T_{II}$. M of the region II is determined according to $$M_{II} = \left(\frac{1}{R_{1,I+II}} - \frac{1}{R_{1I}}\right)^{-1} \left(\frac{1}{R_{2,I+II}} - \frac{1}{R_{2I}}\right)$$

-continued where $$R_{1,I+II} = \frac{U_{(t_1)}}{I_{(t_1)}}; R_{1I} = \frac{U_{(t_0)}}{I_{(t_0)}}$$

$$R_{2,I+II} = \rho(T_{II})\frac{4L}{d_{II}^2\pi}; R_{2,I} = \rho(T_I)\frac{4L}{d_I^2\pi}$$

TABLE 1

Values for example 1

| Point in time | Region | d [m] | $T_{OF}$ [°C.] | $T_S$ [°C.] | ρ [Ω*m] | L [m] | $R_2$ [Ω] | U [V] | I [A] | $R_1$ [Ω] | M |
|---|---|---|---|---|---|---|---|---|---|---|---|
| t_0 | I | 0.09 | 1005 | 1073 | 0.000089 | 2.8 | 0.031 | 95 | 1450 | 0.065 | 1.67 |
| t_1 | I + II | 0.1 | 1000 | 1080 | 0.000087 | 2.8 | 0.030 | 87 | 1700 | 0.0511 | 1.65 |
| t_1 | II | | | | | | 0.146 | | | 0.2338 | 1.59 |

TABLE 2

Values for ρ

| T [°C.] | ρ [Ω*m] |
|---|---|
| 800 | 0.00032 |
| 900 | 0.00019 |
| 1000 | 0.00012 |
| 1100 | 0.00008 |
| 1200 | 0.00006 |
| 1300 | 0.00004 |

Example 2: Deposition of Polysilicon Type B and Type C

The profile of M for two different deposition processes, that is to say 2 different polysilicon qualities, is plotted against the silicon rod diameter d [mm] in FIG. 3. The dashed curve (---) represents the production of type C. The curve depicted in dashes and dots (- -) represents the production of type C. Type B is more compact than type C and is used for more sensitive applications. Type B should have a value for M of from 1.2 to 1.4, whereas type C should have a value of from 1.4 to 1.7. Both processes were conducted in the same Siemens reactor but with different settings for at least one parameter from the group comprising U, I, $T_{OF}$, reaction gas composition and volume flow rate. M was determined continuously during the entire deposition duration. The rod diameter was determined on two rods using a CCD camera and image processing. $T_{OF}$ was likewise determined on two rods using a pyrometer.

Both processes start with compactly deposited polysilicon having values for M of close to 1. Filament rods of very compact silicon were also used. M subsequently increases for both processes. For the production of type C, a relatively steep profile was selected for M just shortly after the start of the deposition. The level of M sought, at 1.4 to 1.7, should be achieved already at a rod diameter of 50 mm. M was subsequently adjusted to a value of approx. 1.45 to 1.5. For the production of type B, a flatter profile of M was set up to a diameter of about 100 mm. From a diameter of approx. 140 mm, M was lowered again in order to deposit the outer approx. 40 mm more compactly.

It becomes clear from the example how conveniently the deposition can be controlled by means of the index M for the production of a very wide variety of polysilicon types.

The invention claimed is:

1. A method for producing polycrystalline silicon, comprising:
introducing a reaction gas, which in addition to hydrogen contains silane and/or at least one halosilane, into a reaction space of a vapour deposition reactor, wherein the reaction space comprises at least one filament rod which is heated by way of the passage of current and on which by means of deposition silicon is deposited to form a polycrystalline silicon rod, wherein in a morphology determination step the determination of the morphology of the silicon rod during the deposition at a rod temperature $T_S$
wherein a first resistance value Ry of the silicon rod is determined according to $$R_1 = \frac{U}{I}$$

wherein U is a voltage between two ends of the silicon rod and I is a current strength;
wherein a second resistance value $R_2$ of the silicon rod is determined according to $$R_2 = \rho\frac{L}{A}$$

wherein ρ is a resistivity of silicon, L is a length of the silicon rod, and A is a cross-sectional area of the silicon rod; and
wherein a morphology index M is calculated from the ratio $R_1/R_2$, wherein the deposition is controlled by varying at least one parameter selected from the group comprising U, I, surface temperature $T_{OF}$, reaction gas composition and standard volume flow rate in such a way that M has a value from 1 to 1.8, wherein U is in a range from 50 to 500 V, wherein I is in a range from 500 to 4500 A, wherein $T_{OF}$ is in a range from 950 to 1200° C., wherein the standard volume flow rate of the reaction gas is 1500 to 9000 m³/h and the reaction gas prior to entry into the reactor contains hydrogen in a proportion of 50% to 90%, and wherein $T_S$ is the surface temperature $T_{OF}$ of the silicon rod or the arithmetic mean of two or more surface temperatures $T_{OF}$ of the same or different silicon rods.

2. The method of claim 1, wherein the index M has a value from 1.2 to 1.6.

3. The method of claim 1, wherein the index M is kept constant during the deposition; or
wherein the index M is determined continuously during the entire deposition or discontinuously at various points in time in the deposition; or wherein the index M is determined in discretized form in a time interval corresponding to a specified growth in the diameter of the silicon rod.

4. The method of claim 1, wherein the determination of the cross-sectional area A of the silicon rod at least one diameter of the silicon rod and/or at least one diameter of at least one other silicon rod is determined.

5. The method of claim 1, wherein the length L of the silicon rod is 2 to 8 m.

6. The method of claim 1, wherein the voltage U is in a range from 55 to 250 V.

7. The method of claim 1, wherein the current strength I is in a range from 1500 to 4000 A.

8. The method of claim 1, wherein the temperature of the rod surface $T_{OF}$ is in a range from 1000 to 1150° C.

9. The method of claim 1, wherein the reaction gas prior to entry into the reactor contains hydrogen in a proportion of 60% to 80%.

10. The method of claim 1, wherein the standard volume flow rate of the reaction gas is from 3000 to 8000 m³/h.

11. The method of claim 1, wherein the length L of the silicon rod is 3 to 7 m.

12. The method of claim 1, wherein the length L of the silicon rod is 4 to 6.6 m.

13. The method of claim 1, wherein the length L of the silicon rod is 5.6 to 6.4 m.

14. The method of claim 1, wherein the voltage U is in a range from 60 to 100 V; or
wherein the current strength/is in a range from 2500 to 3500 A.

15. Method for producing polycrystalline silicon, comprising:
introducing a reaction gas, which in addition to hydrogen contains silane and/or at least one halosilane, into a reaction space of a vapour deposition reactor, wherein the reaction space comprises at least one filament rod which is heated by way of the passage of current and on which by means of deposition silicon is deposited to form a polycrystalline silicon rod, wherein for the determination of the morphology of the silicon rod during the deposition at a rod temperature $T_S$
wherein a first resistance value Ry of the silicon rod is determined according to $$R_1 = \frac{U}{I}$$

where U is a voltage between two ends of the silicon rod and I is a current strength;
wherein a second resistance value $R_2$ of the silicon rod is determined according to $$R_2 = \rho \frac{L}{A}$$

wherein ρ is a resistivity of silicon, L is a length of the silicon rod and A is a cross-sectional area of the silicon rod; and
wherein a morphology index M is calculated from the ratio $R_1/R_2$, wherein the deposition is controlled by varying at least one parameter selected from the group comprising U, I, surface temperature $T_{OF}$, reaction gas composition and standard volume flow rate in such a way that for the production of
a polysilicon type B M has a value of 1.2 to 1.4, or
a polysilicon type C M has a value of 1.4 to 1.7, or
a polysilicon type D M has a value of greater than 1.7,
wherein U is in a range from 50 to 500 V, I is in a range from 500 to 4500 A, $T_{OF}$ is in a range from 950 to 1200° C., the standard volume flow rate of the reaction gas is 1500 to 9000 m³/h and the reaction gas prior to entry into the reactor contains hydrogen in a proportion of 50% to 90%, and wherein $T_S$ is the surface temperature $T_{OF}$ of the silicon rod or the arithmetic mean of two or more surface temperatures $T_{OF}$ of the same or different silicon rods.

16. The method of claim 15, wherein the index M has a value from 1 to 1.8.

17. The method of claim 15, wherein the index M is kept constant during the deposition; or
wherein the index M is determined continuously during the entire deposition or discontinuously at various points in time in the deposition; or
wherein the index M is determined in discretized form in a time interval corresponding to a specified growth in the diameter of the silicon rod.

18. The method of claim 15, wherein the determination of the cross-sectional area A of the silicon rod at least one diameter of the silicon rod and/or at least one diameter of at least one other silicon rod is determined.

19. The method of claim 15, wherein the length L of the silicon rod is 2 to 8 m; or
wherein the voltage U is in a range from 55 to 250 V; or
wherein the current strength I is in a range from 1500 to 4000 A; or
wherein the temperature of the rod surface $T_{OF}$ is in a range from 1000 to 1150° C.

20. The method of claim 15, wherein the reaction gas prior to entry into the reactor contains hydrogen in a proportion of 60% to 80%; or
wherein the standard volume flow rate of the reaction gas is from 3000 to 8000 m³/h.

* * * * *